United States Patent Office.

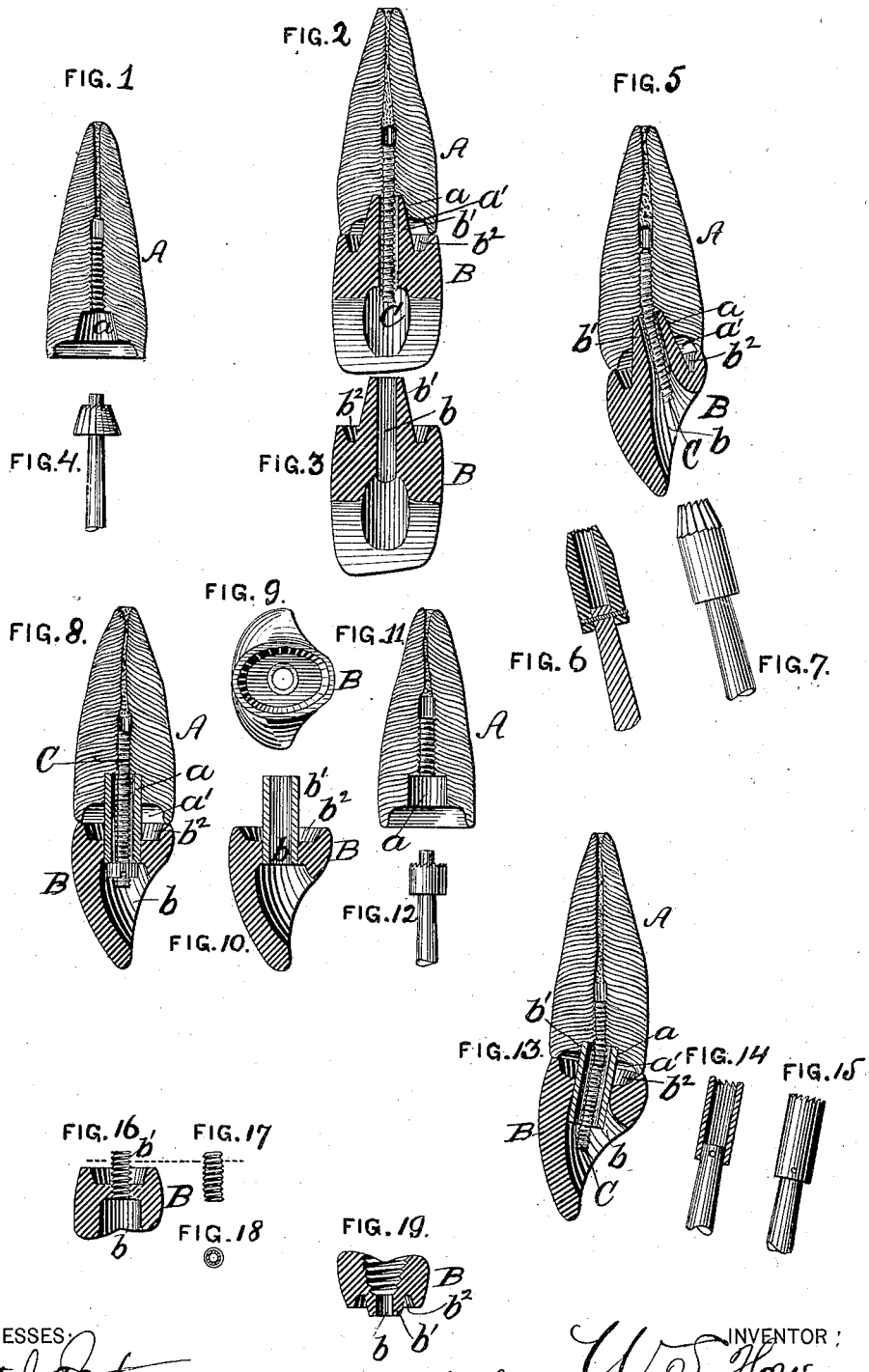

WOODBURY STORER HOW, OF PHILADELPHIA, PA., ASSIGNOR TO THE S. S. WHITE DENTAL MANUFACTURING COMPANY, OF SAME PLACE.

ARTIFICIAL TOOTH-CROWN.

SPECIFICATION forming part of Letters Patent No. 313,733, dated March 10, 1885.

Application filed January 26, 1884. (No model.)

*To all whom it may concern:*

Be it known that I, WOODBURY STORER HOW, of the city and county of Philadelphia, in the State of Pennsylvania, have invented certain new and useful Improvements in Artificial Tooth-Crowns, of which the following is a specification.

My invention relates to artificial tooth-crowns for application to natural tooth-roots remaining in the mouth, and constitutes more especially an improvement upon an artificial crown invented by me, and for which I make a simultaneous application for Letters Patent herewith.

In my said improved crown there is a central opening extending from the base of the crown, either partially or wholly through it, while there is a cervical or basal channel or groove extending a short distance into the crown, surrounding said central opening.

The object of my present improvement is to improve such a crown by extending the inner walls of said channel or groove, and consequently the walls of the central opening, beyond the base of the crown, so as to fit a correspondingly-shaped recess formed for its reception in the end of the root.

The subject-matter herein claimed is particularly recited at the close of the specification.

In the accompanying drawings, Figure 1 is a sectional view of a root prepared to receive my improved crown. Fig. 2 is a section through the root and crown, the two being fitted together. Fig. 3 is a sectional view of the crown detached. Fig. 4 is a view of the working end of an instrument for preparing the recess in the end of the root to receive the annular boss of the crown. Fig. 5 is a section through the root and crown, the crown being mounted upon the root on an inward inclination. Figs. 6 and 7 are views of the tool for preparing the recess in the root. Fig. 8 is a section of a root and crown fitted thereto, the crown being modified in construction; and Figs. 9 and 10 are a basal plan and sectional view, respectively, of said modified form of crown. Fig. 11 is a sectional view of a root prepared to receive the modified crown; and Fig. 12 is a view of the end of an instrument for preparing the recess in the root. Fig. 13 is a sectional view of a root and crown, showing the crown as mounted on the root with an outward inclination; and Figs. 14 and 15 are views of the instrument for forming the recess in the root. Fig. 16 is a sectional view of a modified form of crown in which the projecting boss at the base thereof is threaded or grooved; and Figs. 17 and 18 are views of the tube constituting a part of the crown and forming the extended boss thereof; and Fig. 19 is a view of still another modification, the walls of the longitudinal opening in the crown being threaded, or provided with grooves or shoulders.

The tooth-roots A, which are to receive my improved crowns, are prepared in the usual way, and in addition the root is provided in its end with a seat, $a$, to receive a correspondingly-shaped central projection or boss of the crown in the form shown in Figs. 2, 3, 5, and 19.

My improved crown B is provided with a central opening, $b$, which may or may not extend entirely through it, with a projecting boss, $b'$, and with a circumferential groove or channel, $b^2$, in its base surrounding said central opening, $b$. The crown shown in the figures before mentioned is preferably made of porcelain, or in a homogeneous mass, in well-known ways, and when molded and baked is provided with the projecting boss $b'$, before mentioned. In said Figs. 2, 3, 5, and 19 the extended or projecting boss $b'$, through which the vertical opening in the crown extends, has a tapering exterior or periphery. In fitting such a crown to the root a correspondingly-shaped recess, $a$, is formed therein—for instance, by the tool shown in Figs. 4, 6, and 7, which may be rotated by hand or by a power-driven engine, such as commonly used by dentists in drilling teeth. The edges at the periphery of the crown are now nicely fitted, so as to coincide with the adjacent edges of the root, in order to obtain a close joint and enable the boss $b'$ to accurately and snugly fit its seat $a$ in the tooth-root.

In setting or applying the crown, the recess $a'$, forming a continuation of the recess $a$ of the root, has plastic filling—such as cement or an amalgam—packed in it circumferentially, so as not to obstruct the passage to the seat $a$ in the root. Cement or amalgam is then packed in the basal channel or groove $b^2$ of the crown, and the crown is then forced upon the end of the root, so as to unite the cement of the root and crown in a body, and permit any surplus to escape outwardly before the joint is closed by the pressure of the crown upon the root. The central boss, $b'$, is thereby carried firmly into the seat $a$ in the root, while the anchoring-post C, which was before inserted in the root, enters or lies in the vertical opening $b$ in the crown. The finishing operation is then completed by packing a suitable cement or amalgam into said crown-opening around the post, so as to secure a firm connection between the post, cement, and crown, the final finishing operation being then performed by filling the coronally-enlarged end of the crown-opening $b$. Instead, however, of enlarging the crown-opening at its outer end, the opening may be cylindrical, square, or other shape, and be given retaining form in other well-known ways.

It will be obvious that as soon as the cement or amalgam becomes set or hardened a secure attachment of the crown to the root is effected, and increased strength is given the connection by extending a portion of the crown centrally into the tooth-root, or substantially so, and this feature of an artificial crown having a basal extension to fit the corresponding seat in the end of the root is, as far as I am aware, broadly new with me.

In Figs. 8, 9, 10, 13, and 16 I have shown the extended basal boss or tube $b'$ as formed by a metal tube, while the body of the crown may be of porcelain, the tube being integral with and forming a rigid portion of the crown by being baked in said body in the process of manufacture. In said last-mentioned figures, therefore, it will be seen that the extended boss at the base of the crown is a plain tube—that is to say, is not a tapered boss, as in the other figures—consequently the seat for this cylindrical boss in the end of the root will be a plain cylindrical recess. The fitting and application of the root to the crown may be the same as that described above in connection with the first form of crown.

In Fig. 16 the tubular boss or extension $b'$ of the crown is screw-threaded externally, and may be fitted in a seat, similar to that in Figs. 8, 11, and 13, for instance. By means of the threads it will be seen that the cement or filling material surrounding the boss may take a firm hold thereof, and thus aid in securing the crown to the root.

In Fig. 19 I have shown a porcelain crown for bicuspids; and in this example the crown-opening $b$ tapers outwardly, and, moreover, has its walls threaded or shouldered, so as to enable a firm hold of the plastic filling to be had thereon.

Before stating what I claim herein I would have it understood that this application is subordinate to my other application, hereinbefore mentioned, filed simultaneously herewith; and a disclaimer is herein entered in favor of said application (No. 118,849 of January 26, 1884) to all matter common to that and this present case.

I claim herein—

1. An artificial tooth-crown provided at its base with a tubular boss projecting beyond the outer walls of said base, the body of the crown and said boss being united by baking them together, substantially as described.

2. An all-porcelain tooth-crown provided at its base with a tubular boss projecting beyond the outer walls of said base, and with an independent channel or groove surrounding said boss, substantially as described.

In testimony whereof I have hereunto subscribed my name this 24th day January, A. D. 1884.

WOODBURY STORER HOW.

Witnesses:
   WM. J. PEYTON,
   JAMES YOUNG.